(12) United States Patent
Nishikawa

(10) Patent No.: US 12,436,157 B2
(45) Date of Patent: Oct. 7, 2025

(54) ANALYSIS METHOD, ANALYSIS DEVICE, ANALYSIS SYSTEM, AND ANALYSIS PROGRAM FOR ANALYZING A BLEEDING TENDENCY OF A SUBJECT

(71) Applicant: SYSMEX CORPORATION, Kobe (JP)

(72) Inventor: Satomi Nishikawa, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 814 days.

(21) Appl. No.: 17/698,144

(22) Filed: Mar. 18, 2022

(65) Prior Publication Data
US 2022/0299534 A1 Sep. 22, 2022

(30) Foreign Application Priority Data
Mar. 19, 2021 (JP) .................. 2021-046534

(51) Int. Cl.
G01N 33/86 (2006.01)
(52) U.S. Cl.
CPC .......... *G01N 33/86* (2013.01); *G01N 2458/15* (2013.01)
(58) Field of Classification Search
CPC .... G01N 33/86; G01N 33/49; G01N 33/4905; G01N 2458/15
USPC ...................... 436/63, 69; 422/73
See application file for complete search history.

(56) References Cited

U.S. PATENT DOCUMENTS

| 10,048,249 B2 | 8/2018 | Nishimura et al. |
| 10,215,766 B2 * | 2/2019 | Shima ................ G01N 33/4905 |
| 2013/0344519 A1 * | 12/2013 | Leong .................... G01N 33/86 435/13 |
| 2016/0291042 A1 | 10/2016 | Kumano et al. |

(Continued)

FOREIGN PATENT DOCUMENTS

| JP | 2016-118442 A | 6/2016 |
| JP | 2018-017619 A | 2/2018 |

(Continued)

OTHER PUBLICATIONS

Wada et al. Clinical and Applied Thrombosis/Hemostasis, vol. 26, 2020, pp. 1-8.*

(Continued)

*Primary Examiner* — Maureen Wallenhorst
(74) *Attorney, Agent, or Firm* — Sughrue Mion, PLLC

(57) ABSTRACT

PROBLEM: According to the present invention, a patient who experiences severe bleeding is detected based on a value obtained by a common coagulation test.
SOLUTION: The present invention is an analysis method for analyzing the bleeding tendency of a subject, and the problem is resolved by this analysis method which includes obtaining a time-series data set of a coagulation reaction of a blood sample collected from the subject; obtaining, based on the time-series data set, a maximum speed arrival time until a coagulation reaction speed is maximized or a maximum acceleration arrival time until a coagulation reaction acceleration is maximized, and a reference time in the coagulation reaction; obtaining a value based on the maximum speed arrival time or the maximum acceleration arrival time, and the reference time; and outputting the value or information relating to the bleeding tendency based on the value.

11 Claims, 16 Drawing Sheets

(56) References Cited

U.S. PATENT DOCUMENTS

2017/0315142 A1* 11/2017 Shima .................. G01N 21/272
2018/0031539 A1   2/2018 Shima et al.
2018/0045709 A1   2/2018 Shima et al.
2022/0146537 A1* 5/2022 Kawabe ................ G01N 21/47

FOREIGN PATENT DOCUMENTS

JP   2018-185160 A   11/2018
WO   2020/101025 A1   5/2020
WO   2020/158948 A1   8/2020

OTHER PUBLICATIONS

Aghighi et al. Res. Pract. Thromb. Haemost., vol. 4, 2020, pp. 298-308.*
The extended European search report issued on Aug. 26, 2022 in a counterpart European patent application No. 22161327.6.
The Japanese Office Action issued on Sep. 3, 2024 in a counterpart Japanese patent application No. 2021-046534.
Keiji Nogami et al: "Phenotypic Heterogeneity of Hemostasis in Severe Hemophilia", Seminars in Thrombosis and Hemostasis, 2015, vol. 41, No. 8, pp. 826-831, Thieme Medical Publishers, Inc.

* cited by examiner

| 3000 | 3000 | 3000 | ... | 3000 | 2990 | ... | 1010 | 1000 | ... | 1000 |
|------|------|------|-----|------|------|-----|------|------|-----|------|
| 0.0  | 0.1  | 0.2  | ... | xx   | xx   | ... | xx   | xx   | ... | 180.0 |
FIG. 9A
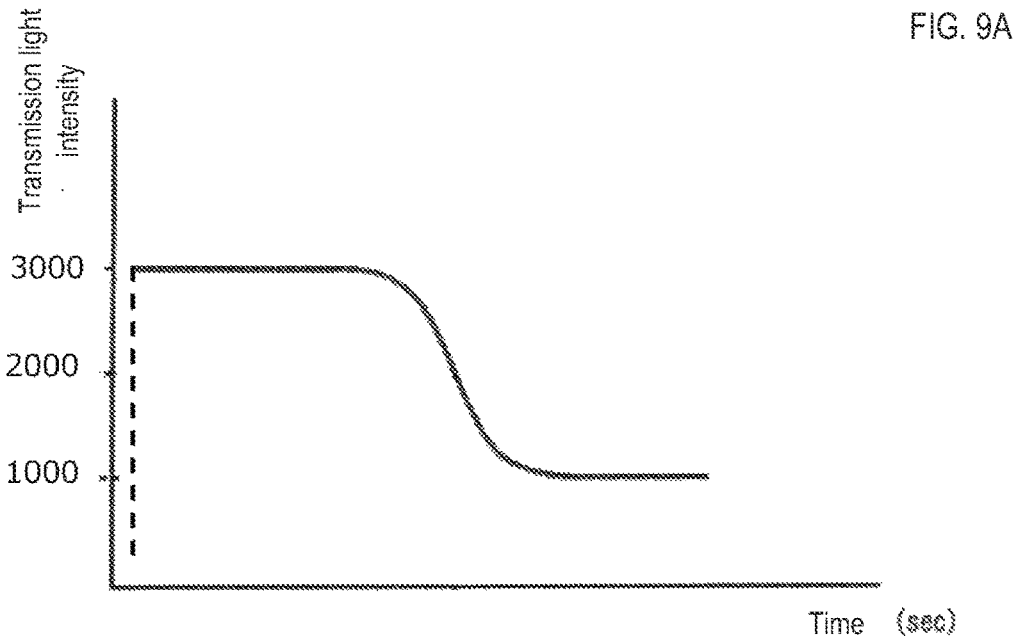
FIG. 9B
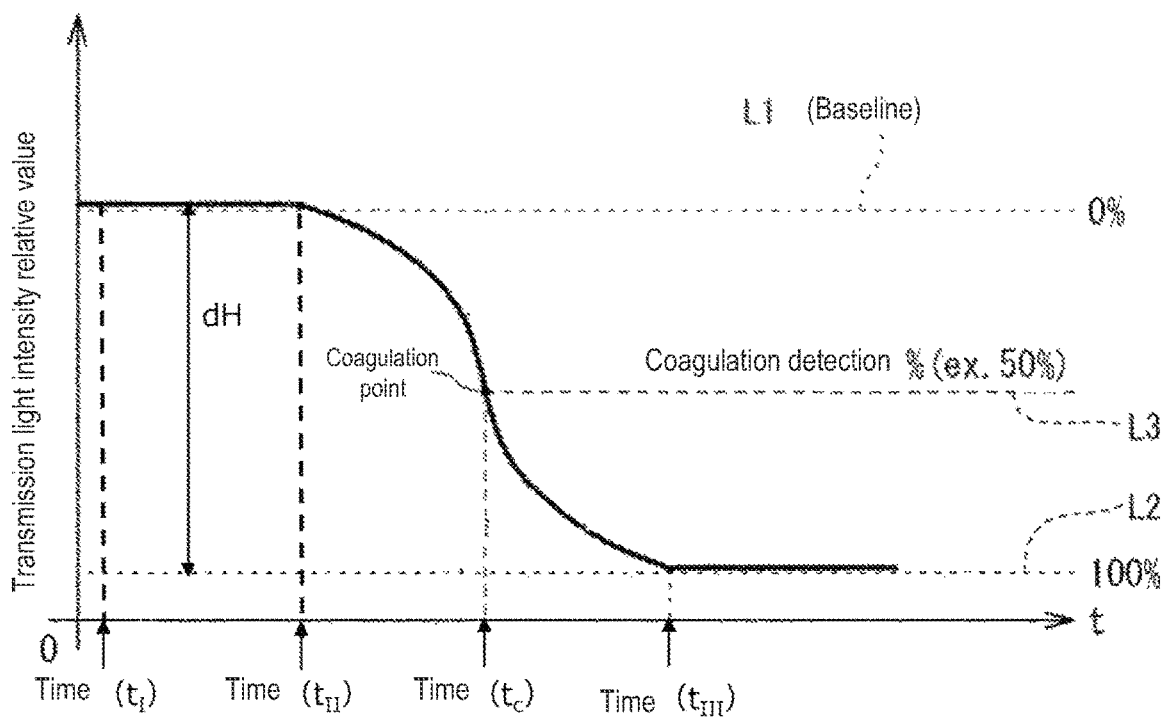
FIG. 9C

ANALYSIS METHOD, ANALYSIS DEVICE, ANALYSIS SYSTEM, AND ANALYSIS PROGRAM FOR ANALYZING A BLEEDING TENDENCY OF A SUBJECT

CROSS REFERENCE TO RELATED APPLICATIONS

This application claims priority from prior Japanese Patent Application No. 2021-046534, filed on Mar. 19, 2021 entitled "ANALYSIS METHOD, ANALYSIS DEVICE, ANALYSIS SYSTEM, AND ANALYSIS PROGRAM FOR ANALYZING A BLEEDING TENDENCY OF A SUBJECT", the entire contents of which are incorporated herein by reference.

FIELD OF THE INVENTION

The present invention relates to an analysis method, an analysis device, an analysis system, and an analysis program for analyzing a bleeding tendency of a patient.

BACKGROUND

WIPO Patent Publication No. 2020/158948 discloses a method for determining the severity of hemophilia A in a patient. In the method of WIPO Patent Publication No. 2020/158948, a corrected linear curve is calculated from the coagulation reaction curve of the blood of the subject, the calculation target area value S is calculated from the obtained corrected linear curve with the maximum height value Vmax (100%) set at 5%, 10%, 20%, 30%, 40%, 50%, 60%, 70%, 80%, and 90%, respectively, of the maximum height value Vmax (100%), 10 individual calculation target areas are extracted, and the flattening vAB and the time rate vTB are calculated for the target area at each calculated target area value S. The flattening vAB and the time rate vTB are calculated from the corrected linear curve for the target area at each calculation target area value S concerning blood (template specimens) from patients with severe, moderate, and mild hemophilia A, the severity of which was determined based on the activity level of coagulation factor VIII (FVIII). Then, a linear regression equation is obtained between the flatness vAB and time rate vTB of the blood of the subject and the flatness vAB and time rate vTB of each template sample, and the template sample with the highest correlation is determined to determine the severity of hemophilia A of the patient.

When a patient with hemophilia A experiences severe bleeding, sequelae may remain on the body, especially at the joints, and the quality of life (QOL) may be significantly impaired. The severity of hemophilia A patients is determined by measuring the activity level of FVIII. However, even patients who are determined to be mild or moderate by measuring FVIII activity levels can experience severe bleeding. Although WIPO Patent Publication No. 2020/158948 discloses a method for determining the severity of hemophilia A of a patient, since the determination is made based on the correlation with a template sample of a patient whose severity is determined based on the activity level of FVIII, it is not possible to detect a patient who is determined to be mild or moderate case by measuring the activity level of FVIII and later experiences severe bleeding. The present invention detects a patient who experiences severe bleeding, but who cannot be detected by the conventional method of measuring the activity level of FVIII via the method disclosed in WIPO Patent Publication No. 2020/158948.

SUMMARY OF THE INVENTION

The present invention relates to an analysis method for analyzing a bleeding tendency of a subject comprising obtaining a time-series data set of a coagulation reaction of a blood sample collected from the subject; obtaining, based on the time-series data set, a maximum speed arrival time until a coagulation reaction speed is maximized or a maximum acceleration arrival time until a coagulation reaction acceleration is maximized, and a reference time in the coagulation reaction; obtaining a value based on the maximum speed arrival time or the maximum acceleration arrival time, and the reference time; and outputting the value or information relating to the bleeding tendency based on the value.

The present invention relates to an analysis device (100) for analyzing a bleeding tendency of a subject, the analysis device (100) comprises a control device (10), and the control device (10) obtains a time-series data set of a coagulation reaction of a blood sample collected from the subject; obtains, based on the time-series data set, a maximum speed arrival time until a coagulation reaction speed is maximized or a maximum acceleration arrival time until a coagulation reaction acceleration is maximized, and a reference time in the coagulation reaction; obtains a value based on the maximum speed arrival time or the maximum acceleration arrival time, and the reference time; and outputs the value or information relating to the bleeding tendency based on the value.

The present invention relates to a computer-executable analysis program (132) for analyzing a bleeding tendency of a subject, the program being configured to cause, when executed by a computer, the computer to execute the steps of: obtaining a time-series data set of a coagulation reaction of a blood sample collected from the subject; obtaining, based on the time-series data set, a maximum speed arrival time until a coagulation reaction speed is maximized or a maximum acceleration arrival time until a coagulation reaction acceleration is maximized, and a reference time in the coagulation reaction; obtaining a value based on the maximum speed arrival time or the maximum acceleration arrival time, and the reference time; and outputting the value or information relating to the bleeding tendency based on the value.

According to the present invention, it is possible to detect a patient who may experience severe bleeding, which was previously undetectable.

BRIEF DESCRIPTION OF THE DRAWINGS

FIG. 9A is a diagram showing an example of a time series data set; FIG. 9B is a diagram showing a coagulation curve; FIG. 9C is a figure showing a normalized coagulation curve;

DESCRIPTION OF THE EMBODIMENTS OF THE INVENTION

Analysis System 1

The analysis system 1 will be described with reference to FIGS. 1 to 5.

Figure 1:
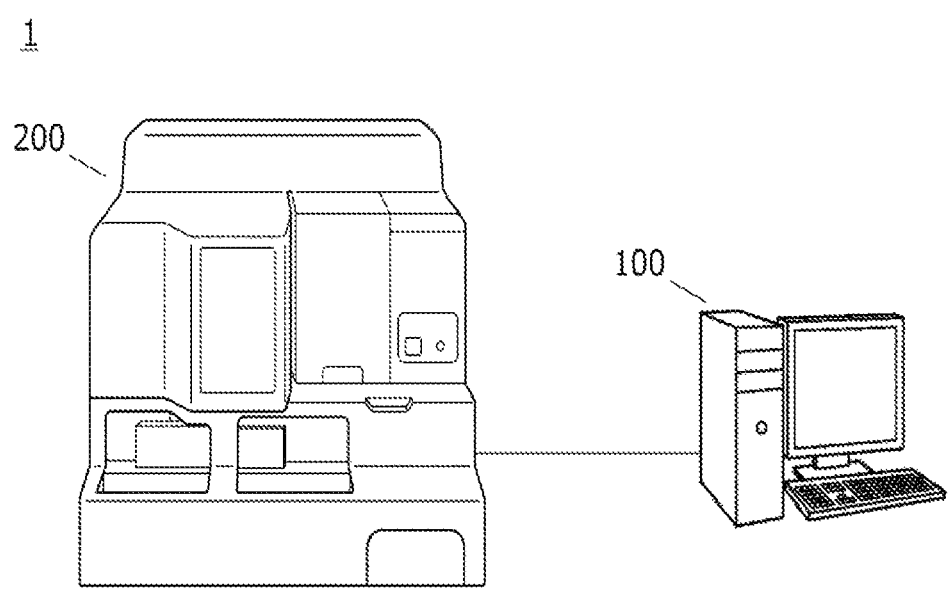
FIG. 1 is a diagram showing the outer appearance of an analysis system 1.

As shown in FIG. 1, the analysis system 1 includes an analyzer 100 for analyzing the bleeding tendency of a subject and a measuring device 200 including a detection unit for irradiating light on a blood sample that has started a coagulation reaction, and obtaining optical information therefrom.

The blood sample to be analyzed by the analysis system 1 is blood collected from a subject or a sample obtained by processing the collected blood. Examples of a blood sample include whole blood or plasma. Blood is preferably collected using an anticoagulant other than a heparin preparation at the time of blood collection. A citrate, for example a sodium citrate solution, can be used as the anticoagulant. As a blood sample, for example, a 3.1% to 3.3% (weight/volume) of trisodium citrate solution may be used as an anticoagulant, and this anticoagulant and the collected blood can be mixed so that the volume ratio is about 1:8.5 to 1:9.5.

The subject from whom blood is collected is not limited, but is, for example, a subject who is suspected of having a bleeding tendency. Subjects suspected of having a bleeding tendency are, for example, patients with low factor VIII activity. Factors that reduce the activity of factor VIII include those occurring due to functional factors and those occurring due to quantitative factors. The subject suspected of having a bleeding tendency is, for example, a patient having hemophilia A.

1-1. Analytical Device 100

Figure 2:
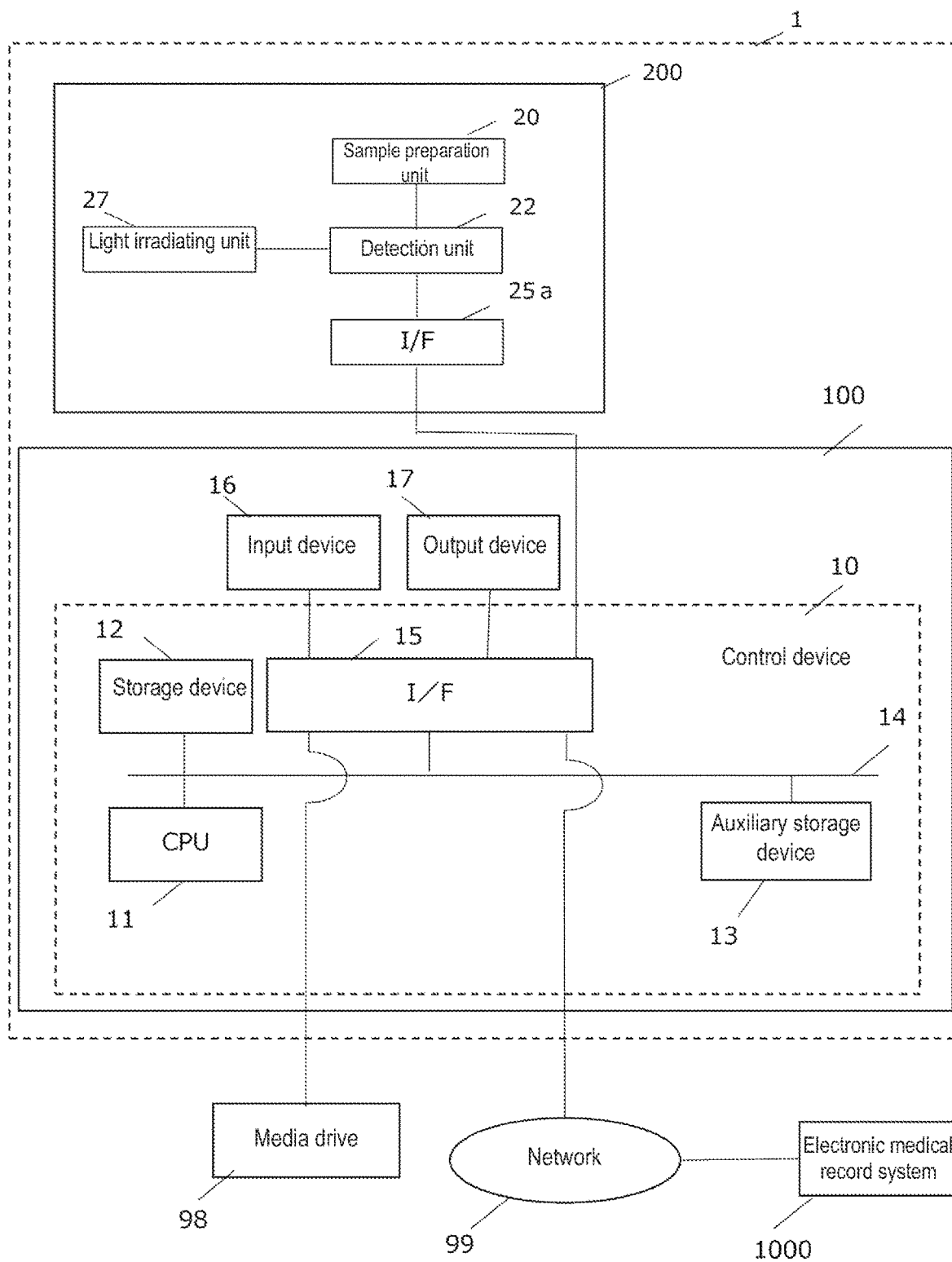
FIG. 2 is a diagram showing the hardware structure of the analysis system 1.

FIG. 2 is a diagram showing the hardware structure of the analysis system 1.

The analysis device 100 is communicably connected to the measuring device 200. The analysis device 100 is connected to a media drive 98. The analysis device 100 is connected to an electronic medical record system 1000 via the network 99. The network 99 is, for example, a local area network (LAN), but may be the Internet.

The analysis device 100 includes a control device 10, an input device 16, and an output device 17. The control device 10 includes a CPU (Central Processing Unit) 11 for performing data processing, a main storage device 12 used as a work area for data processing, an auxiliary storage device 13 for storing information transferred to the main storage device 12, a bus 14 for transmitting data between each device, and an interface (I/F) 15 for inputting/outputting data to/from an external device. The input device 16, the output device 17, the media drive 98, the network 99, and the measuring device 200 are connected to the interface (I/F) 15. The interface (I/F) 15 is, for example, a USB, IEEE1394, or Ethernet. The auxiliary storage device 13 is, for example, a solid state drive or a hard disk drive. The input device 16 is, for example, a keyboard or a mouse, and the output device 17 is, for example, a liquid crystal display or an organic EL display. Information regarding the bleeding tendency of the subject is output to the output device 17.

Figure 3:
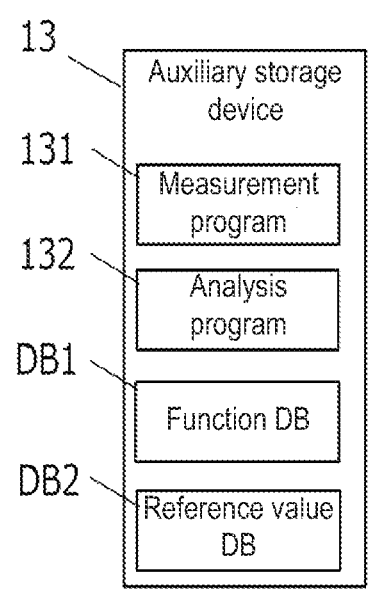
FIG. 3 is a diagram showing information stored in an auxiliary storage device 13.

FIG. 3 is a diagram showing information stored in the auxiliary storage device 13. The auxiliary storage device 13 includes a measurement program 131 for the measuring device 200 to measure blood coagulation, an analysis program 132 for analyzing the bleeding tendency of the subject, and a function database (DB) DB1 for storing mathematical formulas used for the analysis, and a reference value database (DB) DB2 for storing the reference values.

1-2. Measuring Device Structure

Returning to FIG. 2, the hardware structure of the measuring device 200 is described below. The measuring device 200 includes a sample preparation unit 20 for preparing a sample so as to start the blood sample coagulation reaction, a light irradiation unit 27, a detection unit 22, and an interface (I/F) 25. The interface (I/F) 15 is, for example, a USB, IEEE1394, or Ethernet.

Figure 4:
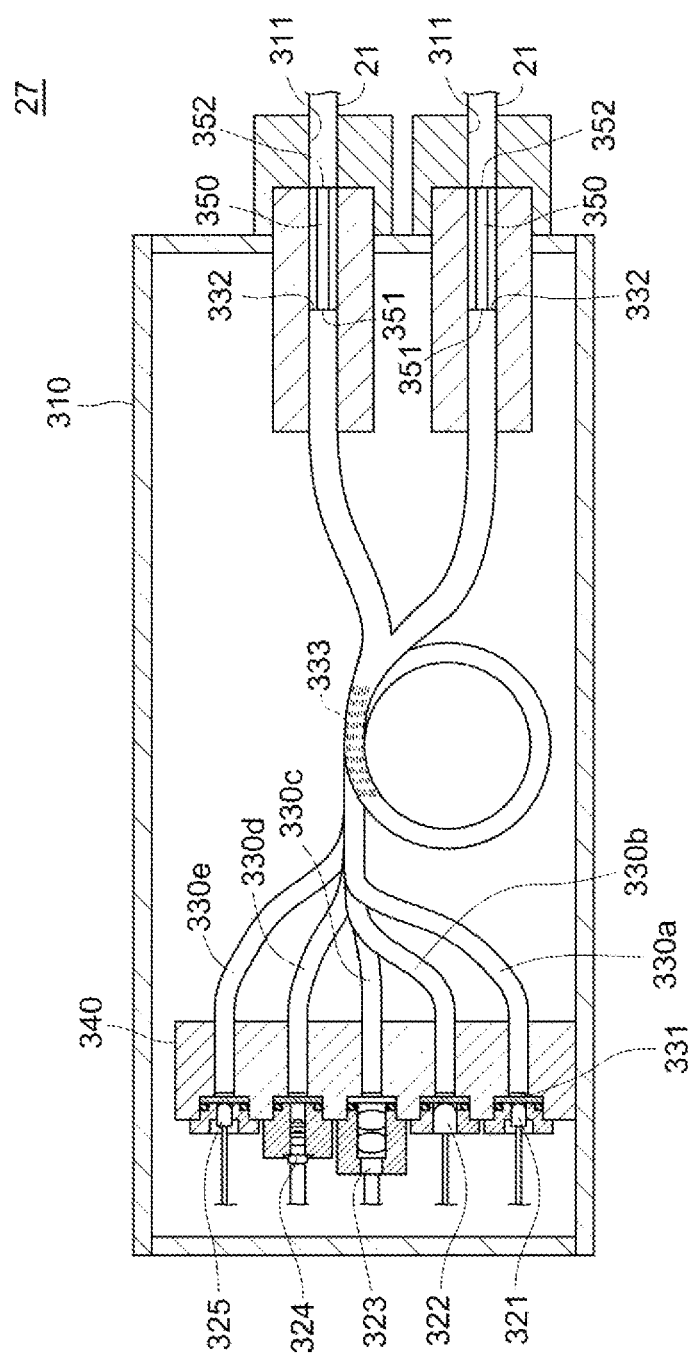
FIG. 4 is a diagram showing the structure of a light irradiation unit of a measuring device 200.

FIG. 4 shows the structure of the light irradiation unit 27. The light irradiation unit 27 includes five light sources 321, 322, 323, 324, and 325, five optical fiber units 330a, 330b, 330c, 330d and 330e provided corresponding to the five light sources 321 to 325, and one holding member 340 for holding the 321 to 325 and the incident end 331 of the optical fiber portions 330a to 330e. The light sources 321 to 325, the optical fiber portions 330a to 330e, and the holding member 340 are housed in a metal housing 310. The light sources 321 to 325 are all composed of LEDs, and the first light source 321 generates light of 660 nm. The second light source 322 generates light of 405 nm. The third light source 323 generates light of 800 nm. The fourth light source 324 generates light of 340 nm. The fifth light source 325 generates light of 575 nm. The light sources 321 to 325 generate light under the control of the control device 10 of the measuring device 200.

Each of the optical fiber portions 330a to 330e is configured as a cable in which optical fiber strands having one core are bundled. The optical fiber portions 330a to 330e are bundled together in the intermediate portion 333, the optical fiber portions 330a to 330e bundled together are divided into two bundles, and the emission end 332 of each bundle is held by an outlet 311 provided in the housing 310. The outlet 311 also holds an incident end 352 of the optical fiber 21 connecting the light irradiation unit 27 and the detection unit 22. An equalizing member 350 for equalizing the intensity distribution of the light emitted from the emitting end 332 is provided between the emitting end 332 of the optical fiber portions 330a to 330e and the incident end 352 of the optical fiber 21. The equalizing member 350 is a member that internally multiple-reflects the light incident from the incident surface 351 and is, for example, a polygonal columnar rod equalizer.

Figure 5A:
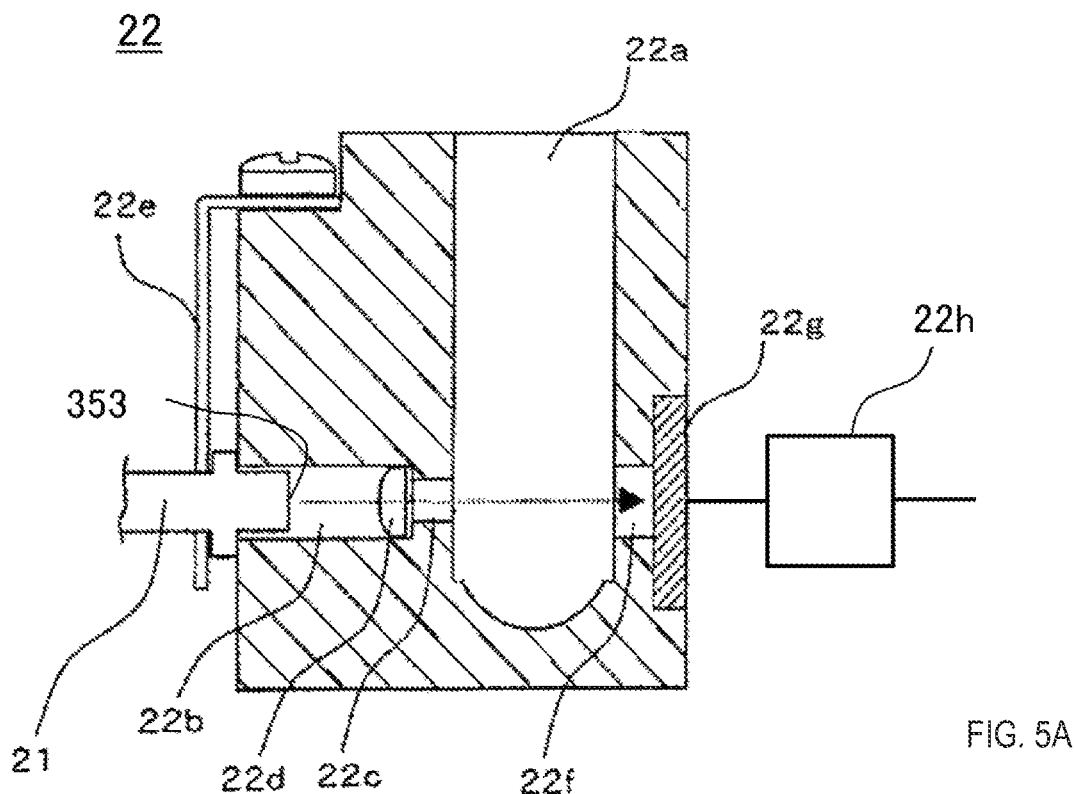
FIG. 5A is a diagram showing the structure of a detection unit 22 without a cuvette 80.
Figure 5B:
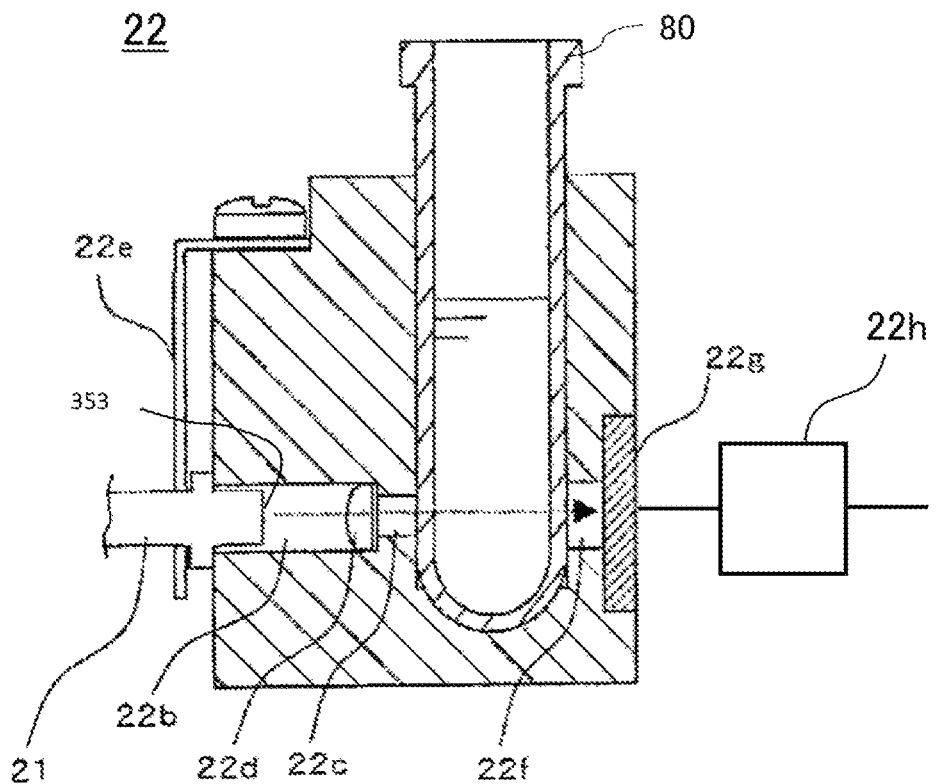
FIG. 5B is a diagram showing the structure of a detection unit 22 with a cuvette 80.

FIGS. 5A and 5B show the structure of the detection unit 22. Note that although a detection unit 22 is provided for each optical fiber 21 connected to the light irradiation unit 27, since the hardware structure of the detection unit 22 is identical to all detection units 22, only a single detection unit 22 is described here. FIG. 5A is a diagram showing a detection unit 22 does not hold the cuvette 80 for mixing the blood sample and coagulation time measuring reagent. The detection unit 22 is formed with a hole 22b into which is inserted the other end 353 of the optical fiber 21 whose incident end 352 (FIG. 4) is held at the outlet 311 of the light irradiation unit 27. The detection unit 22 also is formed with a communication hole 22c that allows the hole 22b to communicate with the holding portion 22a for holding the cuvette 80.

The diameter of the hole 22b is larger than the diameter of the communication hole 22c. A lens 22d that collects light from the optical fiber 21 is arranged at the end of the hole 22b. A hole 22f also is formed on the inner wall surface of the holding portion 22a at a position facing the communication hole 22c. A light receiving unit 22g is arranged behind the hole 22f. The light receiving unit 22g is, for example, a photodiode, and outputs an electric signal according to the amount of received light. The light transmitted through the lens 22d is incident on the light receiving surface of the light receiving unit 22g through the communication hole 22c, the holding portion 22a, and the hole 22f. The optical fiber 21 is fixed by a leaf spring 22e with the end portion 353 inserted into the hole 22b.

FIG. 5B is a diagram showing a detection unit 22 in a state of holding the cuvette 80. When the cuvette 80 is held by the holding portion 22a, the light collected by the lens 22d passes through the cuvette 80 and the sample contained in the cuvette 80, and is incident on the light receiving unit 22g. As the blood coagulation reaction proceeds in the sample, the turbidity of the sample increases. In conjunction with this, the amount of light transmitted through the sample (transmitted light amount) decreases, and the level of the electric signal output from the light receiving unit 22g decreases. The electric signal output from the light receiving unit 22g is converted into a digital signal by the A/D converter 22h, and transmitted to the analysis device 100 via the communication I/F 25 (see FIG. 1). The signal output from the light receiving unit 22g and converted by the A/D converter 22h is optical information reflecting the amount of transmitted light.

Note that the device described in U.S. Pat. No. 10,048,249 can be used as the measuring device 200, and the specification thereof is incorporated by reference in the present specification.

1-3. Measurement Processing and Analysis Processing

Figure 6:
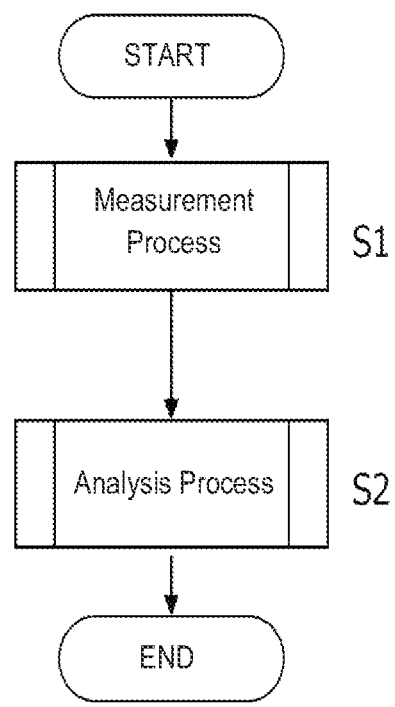
FIG. 6 is a diagram showing a flow of measurement processing and analysis processing.

FIG. 6 shows the flow of measurement/analysis processing by the control device 10 of the analysis device 100. The control device 10 executes the measurement process based on the measurement program 131 in step S1. Next, the control device 10 executes the analysis process based on the analysis program 132 in step S2.

1-4. Measurement Program Process

Figure 7:
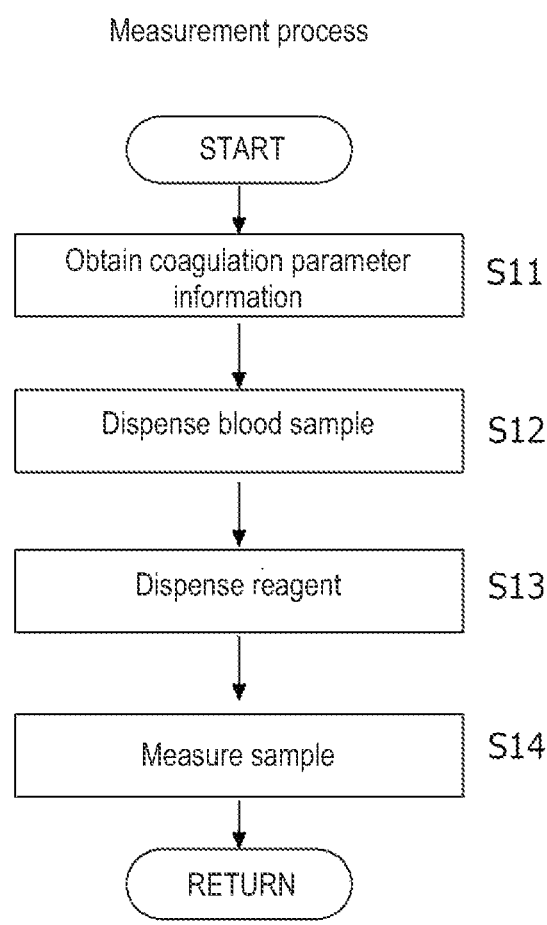
FIG. 7 is a diagram showing a flow of measurement processing.

FIG. 7 shows the flow of the measurement process executed by the control device 10 based on the measurement program 131.

The control device 10 receives a measurement start request input by the operator from the input device 16, and in step S11 acquires information on the blood coagulation parameter (test item) ordered for each blood sample for each blood sample based on the information input by the operator from the input device 16. Note that the control device 10 also may acquire information on blood coagulation parameters from, for example, an electronic medical record system 1000 in a medical facility via a network 99.

A case in which the blood coagulation parameter (test item) acquired in step S11 is the activated partial thromboplastin time (hereinafter, may be abbreviated as "APTT") will be described below. When measuring APTT, a coagulation time measuring reagent and a coagulation activating reagent are used. A test reagent for APTT measurement containing an activator such as silica, elladic acid, or Celite, and an animal-derived, plant-derived, or artificially synthesized phospholipid can be used as the coagulation time measuring reagent. Examples of test reagents for APTT measurement include Thromboplast (registered trademark) APTT series manufactured by Sysmex Corporation, Coagupia (registered trademark) APTT-N manufactured by Sekisui Medical Co., Ltd., and Data Phi APTT produced by Siemens Healthcare Diagnostics Products GmbH. The coagulation activation reagent is a reagent capable of supplying calcium ions, and is, for example, a 20 mM calcium chloride solution.

The control device 10 controls the sample preparation unit 20 of the measuring device 200 so as to dispense the blood sample to the cuvette 80 in step S12.

The control device 10 controls the sample preparation device 2 of the measuring device 200 to prepare a measurement sample by dispensing a coagulation time measuring reagent corresponding to the blood coagulation parameter acquired in step S11 to the cuvette 80 into which the blood sample has been dispensed in step S13. In step S13, the control device 10 controls the sample preparation unit 20 of the measuring device 200 so as to dispense the coagulation activating reagent to the blood sample to which the coagulation time measuring reagent has been dispensed.

In step S14, the control device 10 controls the light irradiation unit 27 so as to start light irradiation on the cuvette 80 to which the coagulation activation reagent is dispensed in step S13. In this example, the control device 10 controls the light irradiation unit 27 so that only the first light source 321 irradiates the light. The control device 10 receives a signal (digital data) corresponding to the intensity of the light received through the cuvette 80 and the measurement sample, which is output from the light receiving unit 22g, from the time when the coagulation activation reagent is dispensed into the cuvette 80, and this light is continuously received until a predetermined measurement time (for example, 120 seconds to 180 seconds) is reached. The control device 10 stores the continuously received digital data in the auxiliary storage device 13 as a time-series data set relating to the coagulation reaction of the blood sample. The time interval for the control device 10 to receive digital data is, for example, 0.1 seconds to 0.5 seconds.

1-5. Analysis Program Process

Figure 8:
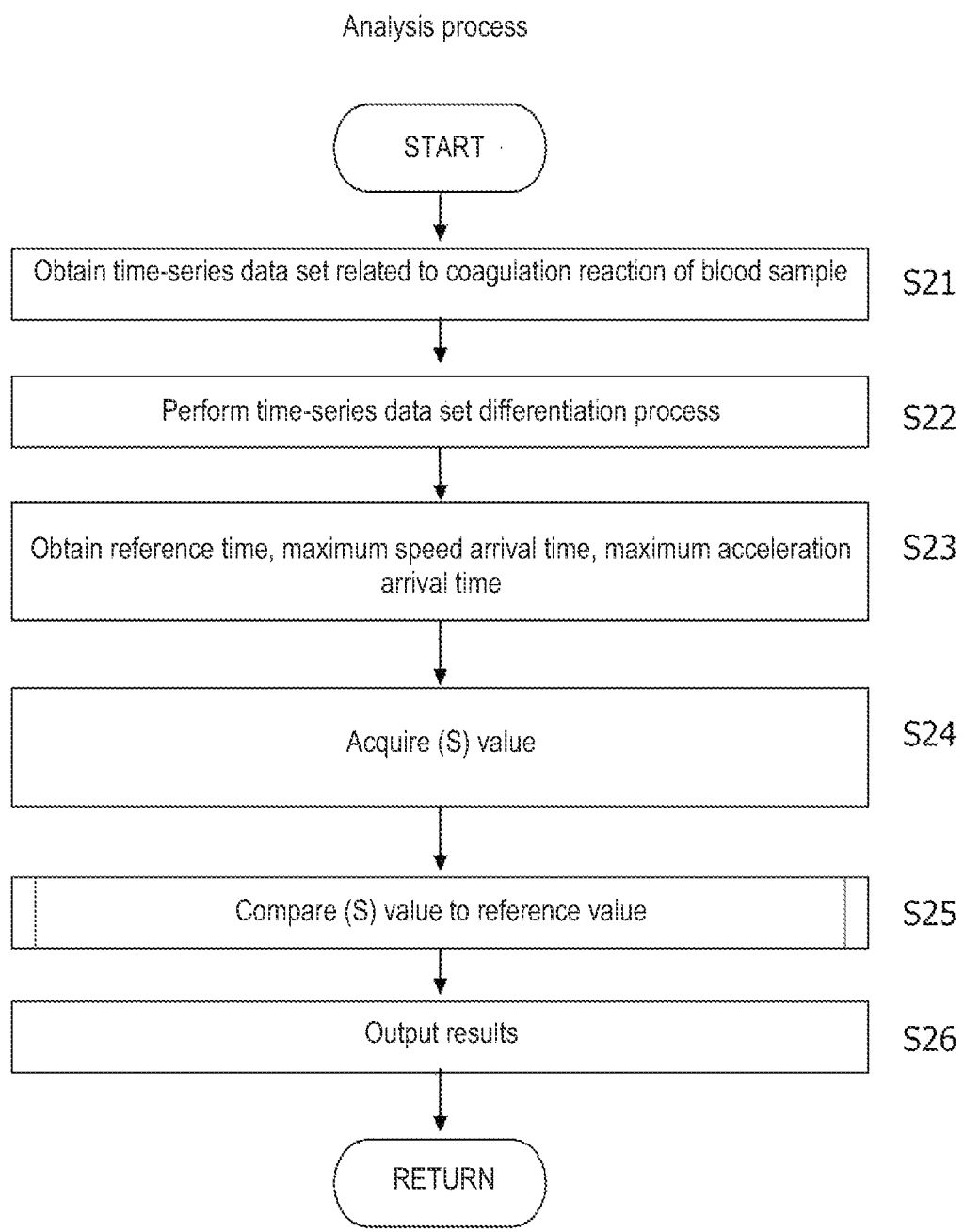
FIG. 8 is a diagram showing a flow of analysis processing.

FIG. 8 shows the flow of the analysis process for analyzing the bleeding tendency of the subject executed by the control device 10 based on the analysis program 132. The control device 10 starts the analysis process by receiving a measurement start request input by the operator from the input device 16. Note that the control device 10 also may start the analysis process with the end of step S14 shown in FIG. 7 as a trigger. The control device 10 also may measure the activity level of FVIII in step S1 shown in FIG. 6, compare the activity level of FVIII with a predetermined value (for example, 10%), and when the activity level of FVIII is less than the predetermined value, the analysis process may be started. The predetermined value is not particularly limited, but is preferably an activity level diagnosed as mild or moderate in the severity determination of a hemophilia A patient. When the activity level of FVIII is less than the predetermined value, it is more likely to cause serious bleeding later than when it is larger than the predetermined value. Therefore, by performing an analysis process on a subject whose FVIII activity level is less than a predetermined value, it is possible to efficiently detect a patient who may experience serious bleeding.

In step S21, the control device 10 acquires a time-series data set relating to the coagulation reaction of the blood sample collected from the subject. Specifically, the control device 10 reads out the time-series data set stored in the auxiliary storage device 13 in step S14.

The time series data set will be described in more detail with reference to FIGS. 9A and 9B. In this example, the time-series data set is a set of two-dimensional array data consisting of the intensity of the light transmitted through the measurement sample when the measurement sample is irradiated with light (hereinafter referred to as "transmitted light intensity"), and the time when the transmitted light is detected. FIG. 9A is a diagram showing an example of a time series data set. In the time-series data set of FIG. 9A, the upper row shows the transmitted light intensity, and the lower row shows the time when each transmitted light intensity is acquired (the elapsed time from the time ($t_I$) described later). When the time-series array data set is plotted on a two-dimensional graph in which the vertical axis (Y-axis) shows the transmitted light intensity and the horizontal axis (X-axis) shows the measurement time (seconds: sec) in which the transmitted light intensity is monitored, the blood coagulation curve shown in FIG. 9B is obtained.

Next, in S22 shown in FIG. 8, the control device 10 normalizes the blood coagulation curve representing the time-series data set acquired in step S21, and differentiates the obtained blood coagulation curve to obtain a first derivative coagulation curve, then differentiates the first derivative coagulation curve to obtain a second derivative coagulation curve.

FIG. 9C shows the blood coagulation curve obtained by normalizing the blood coagulation curve shown in FIG. 9B. As shown in FIG. 9C, each transmitted light intensity contained in the time series data set is relativized so that the blood coagulation curve obtained by normalization is such that the vertical axis represents between 0% (L1: baseline) and 100% (L2).

Figure 10A:
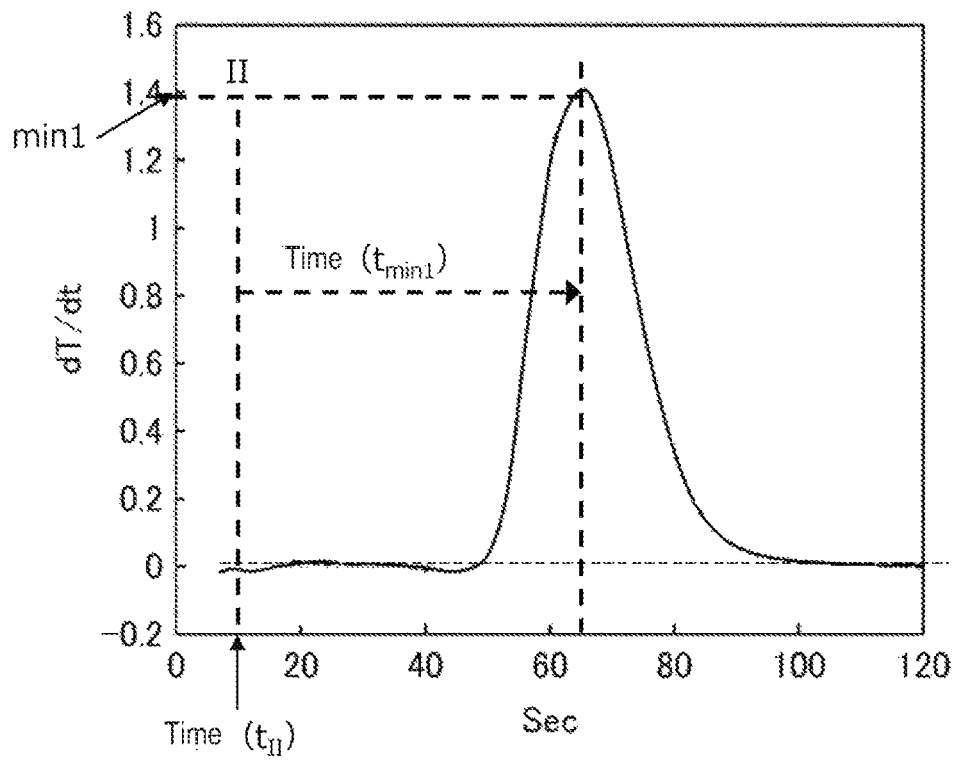
FIG. 10A is a diagram showing a first derivative coagulation curve.
Figure 10B:
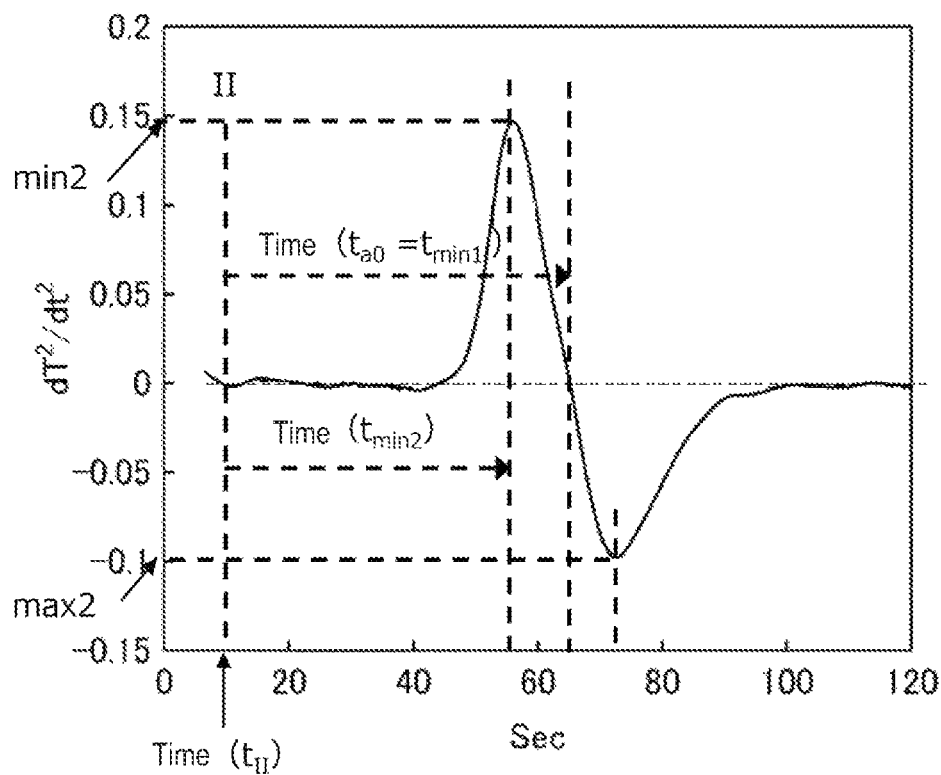
FIG. 10B is a diagram showing a second derivative coagulation curve.

FIG. 10A shows a first derivative coagulation curve obtained by differentiating the blood coagulation curve shown in FIG. 9C. FIG. 10B shows a second derivative coagulation curve obtained by differentiating the first derivative coagulation curve shown in FIG. 10A.

The control device 10 acquires the reference time ($t_c$) in step S23 shown in FIG. 8. The reference time ($t_c$) is, for example, the time from the start of coagulation of a blood sample until it reaches a predetermined coagulation state.

The acquisition of the reference time ($t_c$) will be described with reference to FIG. 9C. In the blood coagulation curve shown in FIG. 9C, the time ($t_I$) is the time when the coagulation activation reagent is added to the blood sample. At time ($t_I$), fibrinogen in the blood sample has not changed to fibrin, and fibrin precipitation does not occur, so the transmitted light intensity shows a high value. Thereafter, when the coagulation reaction proceeds and fibrin begins to precipitate, the precipitated fibrin blocks light and the transmitted light intensity begins to decrease. This time point is the time ($t_{II}$), which is the coagulation reaction start time. The control device 10 acquires the time at which the transmitted light intensity starts to decrease in the blood coagulation curve by calculation, and sets it as the time ($t_{II}$). The control device 10 sets the amount of change in the transmitted light intensity over time ($t_{II}$) to 0%.

Thereafter, as the reaction progresses and the precipitation of fibrin progresses, the transmitted light intensity further decreases. When most of the fibrinogen in the blood sample is converted to fibrin, the reaction converges and the blood coagulation curve achieves a plateau. The control device 10 acquires the time when the blood coagulation curve starts to plateau by calculation, and sets this as the time ($t_{III}$). Time ($t_{III}$) is the time to complete the coagulation reaction. The control device 10 sets the amount of change in the transmitted light intensity over time ($t_{III}$) to 100%. Next, the control device 10 acquires the time (time at the intersection of the line L3 and the blood coagulation curve) when the amount of change in the transmitted light intensity is 50% as the reference time ($t_c$). The reference time ($t_c$) is the coagulation time in this embodiment. The coagulation time need not be 50% change in transmitted light intensity, and any change such as 30%, 40%, 60%, or 70% may be used. The reference time ($t_c$) may be, for example, a constant time counted from the time ($t_{II}$) which is the coagulation reaction start time.

Note that the normalization of the blood coagulation reaction curve can be omitted, in which case the control device 10 acquires the first derivative coagulation curve by differentiating the blood coagulation curve shown in FIG. 9B. The control device 10 also acquires a reference time ($t_c$) based on the blood coagulation curve shown in FIG. 9B.

In step S23 shown in FIG. 8, the control device 10 obtains the maximum speed arrival time ($t_{min1}$), which is the time from the coagulation reaction start time ($t_{II}$) to the maximum speed of the coagulation reaction, by calculation based on the first derivative coagulation curve shown in FIG. 10A acquired in step S22. Note that the control device 10 also may calculate the time ($t_{a0}$) which is the time from the coagulation reaction start time ($t_{II}$) to the acceleration of the coagulation reaction becoming 0, as the maximum speed arrival time ($t_{min1}$) based on the second derivative coagulation curve shown in FIG. 10B.

In step S23 shown in FIG. 8, the control device 10 obtains the maximum acceleration arrival time ($t_{min2}$) which is the time from the coagulation start time ($t_{II}$) to the time the acceleration of the coagulation reaction maximizes based on the second derivative coagulation curve shown in FIG. 10B acquired in step S22.

In step S23 shown in FIG. 8, the control device 10 calculates |min1|, which is the absolute value of the maximum value min1 of the first derivative value, via based on the first derivative coagulation curve shown in FIG. 10A acquired in step S22.

In step S23 of FIG. 8, the control device 10 obtains |min2|, which is an absolute value of the maximum value min2 of the second derivative value, based on the second derivative coagulation curve shown in FIG. 10B acquired in step S22, and calculates |max2|, which is the absolute value of the minimum value max2 of the second derivative value, as the maximum coagulation reaction deceleration (that is, the minimum value of the coagulation reaction acceleration).

In step S24 shown in FIG. 8, the control device 10 acquires a value (S) based on the value acquired in step S23. This value (S) reflects how quickly the blood coagulation reaction proceeded after the start of the blood coagulation reaction. The value (S) reflects that the blood of a subject with a low bleeding tendency, the speed of the blood coagulation reaction is maximized at about the middle point of the blood coagulation reaction, and reflects that the blood of a subject with a high bleeding tendency, the speed of the blood coagulation reaction is maximized earlier than the middle point of the blood coagulation reaction.

The formula for calculating the value (S) is stored in the function database DB1.

The value (S) can be expressed by the following mathematical formula.

$$\text{Value}(S) = (t_c - t_{min1}) \times (|\text{min } 1|) \quad \text{(Formula 1)}$$

(wherein "−" indicates subtraction, and "×" indicates multiplication.)

In step S25 shown in FIG. 8, the control device 10 compares the value (S) acquired in step S24 with a predetermined reference value. The predetermined reference value is a reference value for determining the height of the bleeding tendency of the subject, is set in advance, and is stored in the reference value database DB 2 of the auxiliary storage device 13.

In step S26 shown in FIG. 8, the control device 10 outputs a result based on the comparison between the value acquired in step S25 and the reference value. The results may include information about bleeding tendency.

Information about bleeding tendency includes a label indicating the degree of bleeding tendency. The label indicating the degree of bleeding tendency may indicate the degree of bleeding tendency by a numerical value or a symbol, or may indicate via sentence or a word. Labels indicating the degree of bleeding tendency include a first label indicating a low bleeding tendency and a second label indicating a moderate or high bleeding tendency. The reference value used for the comparison in step S25 is the first reference value for determining whether the subject has a low bleeding tendency or a subject with a moderate or high bleeding tendency.

The first and second labels are associated with the reference value and stored in advance in the reference value database DB2.

The first and second reference values can be set to correspond to, for example, the bleeding score value by the International Society on Thrombosis and Haemostasis Bleeding Assessment Tool (ISTH-BAT) provided by the Japanese Society for Thrombosis and Hemostasis. That is, the value (S) is obtained for the blood samples of a plurality of subjects whose bleeding score values of ISTH-BAT are known, and, for example, the first reference value is set such that the first label is output for subjects whose bleeding score value of ISTH-BAT is 10 or less and the second label is output for subjects whose bleeding score value of ISTH-BAT is greater than 10.

The control device 10 also may output the value (S) acquired in step S24 as a result in step S26 without performing step S25 shown in FIG. 8. Even when the control device 10 performs step S25, the value (S) acquired in step S24 may be output as a result in step S26. In step S26, the control device 10 also may output the value (S) acquired in step S24 and the information on the bleeding tendency based on the comparison result in step S25.

The comparison process of step S25 will be described with reference to FIG. 11.

In step S51, the value (S) and the first reference value are compared, and when the value (S) is larger ("YES"), the control device 10 proceeds to step S53 and selects a second label stored in the reference value database DB2 indicating that the bleeding tendency is moderate or high. The control device 10 proceeds to step S26 shown in FIG. 8 and outputs the second label selected in step S53 to the output device 17 as information indicating that the subject has a moderate or high bleeding tendency.

In step S51, when the value (S) is equal to or less than the first reference value (that is, when the determination is "NO"), the control device 10 proceeds to step S55 and selects the first label stored in the reference value database DB2 indicating that the bleeding tendency is low. The control device 10 proceeds to step S26 shown in FIG. 8 and outputs the first label selected in step S55 to the output device 17 as information indicating that the subject has a low bleeding tendency.

1-6. Example of Analysis System 1 Modification

Although the acquisition of APTT as a blood coagulation parameter (test item) is described in step S11 of FIG. 7 of the above example, the blood coagulation parameter (test item) also may be, for example, prothrombin time (hereinafter sometimes abbreviated as "PT"), thrombotest, fibrinogen, factor VIII activity, factor II activity, factor V activity, factor VII activity, factor IX activity, factor X activity, factor XI activity, factor XII activity, or whole blood coagulation time.

When PT is acquired as a blood coagulation parameter (test item), a test reagent for PT measurement containing thrombin can be used as a coagulation time measuring reagent. Examples of test reagents for PT measurement include Thrombocheck (registered trademark) PT series manufactured by Sysmex Corporation, and Coagupia (registered trademark) PT series manufactured by Sekisui Medical Co., Ltd. Test reagents for PT measurement generally contain calcium ions required for activation of coagulation.

Although the formula 1 is used as the formula for acquiring the value (S) in step S24 of the example above, the value (S) also may be, for example, a value obtained by subtracting the maximum speed arrival time ($t_{min1}$) from the reference time ($t_c$), or a value obtained by subtracting the maximum acceleration arrival time ($t_{min2}$) from the reference time ($t_c$).

The value (S) also may be a value based on a coefficient and a value obtained by subtracting the maximum speed arrival time ($t_{min1}$) from the reference time ($t_c$), or a value obtained by subtracting the maximum acceleration arrival time ($t_{min2}$) from the reference time ($t_c$). The coefficients may be, for example, |min 1|, |min 2|, or coefficients based on |min 2| and |max 2|. For example, a coefficient based on

|min 2| and |max 2| is the difference between two values (|min 2|−|max 2|, or |max 2|−|min 2|) (where "−" indicates subtraction), or may be the division value of the value (|min 2|/|max 2| or |max 2|/|min 2|) (where "/" indicates division). By using the coefficient, the value (S) more strongly reflects how fast the blood coagulation reaction progresses after the start of the coagulation reaction, and the detection sensitivity of a subject with a high bleeding tendency can be improved.

The value (S) may be, for example, a value shown by the following formulae.

$$\text{Value}(S) = (t_c - t_{min1}) \times (|\text{min } 2|) \quad \text{(Formula 2)}$$

$$\text{Value}(S) = ((t_c) - t_{min1}) \times (|\text{min } 2| - |\text{max } 2|) \quad \text{(Formula 3)}$$

$$\text{Value}(S) = (t_c - t_{min1}) \times (|\text{max } 2| - |\text{min } 2|) \quad \text{(Formula 3')}$$

$$\text{Value}(S) = (t_c - t_{min1}) \times (|\text{min } 2|/|\text{max } 2|) \quad \text{(Formula 4)}$$

$$\text{Value}(S) = (t_c - t_{min1}) \times (|\text{max } 2|/|\text{min } 2|) \quad \text{(Formula 4')}$$

$$\text{Value}(S) = (t_c - t_{min1}) \quad \text{(Formula 5)}$$

$$\text{Value}(S) = (t_c - t_{min2}) \times (|\text{min } 1|) \quad \text{(Formula 6)}$$

$$\text{Value}(S) = (t_c - t_{min2}) \times (|\text{min } 2|) \quad \text{(Formula 7)}$$

$$\text{Value}(S) = (t_c - t_{min2}) \times (|\text{min } 2| - |\text{max } 2|) \quad \text{(Formula 8)}$$

$$\text{Value}(S) = (t_c - t_{min2}) \times (|\text{max } 2| - |\text{min } 2|) \quad \text{(Formula 8')}$$

$$\text{Value}(S) = (t_c - t_{min2}) \times (|\text{min } 2|/|\text{max } 2|) \quad \text{(Formula 9)}$$

$$\text{Value}(S) = (t_c - t_{min2}) \times (|\text{max } 2|/|\text{min } 2|) \quad \text{(Formula 9'), or}$$

$$\text{Value}(S) = (t_c - t_{min2}) \quad \text{(Formula 10)}$$

(Where "−" Indicates subtraction; "×" indicates multiplication; "/" indicates division.)

Figure 11:
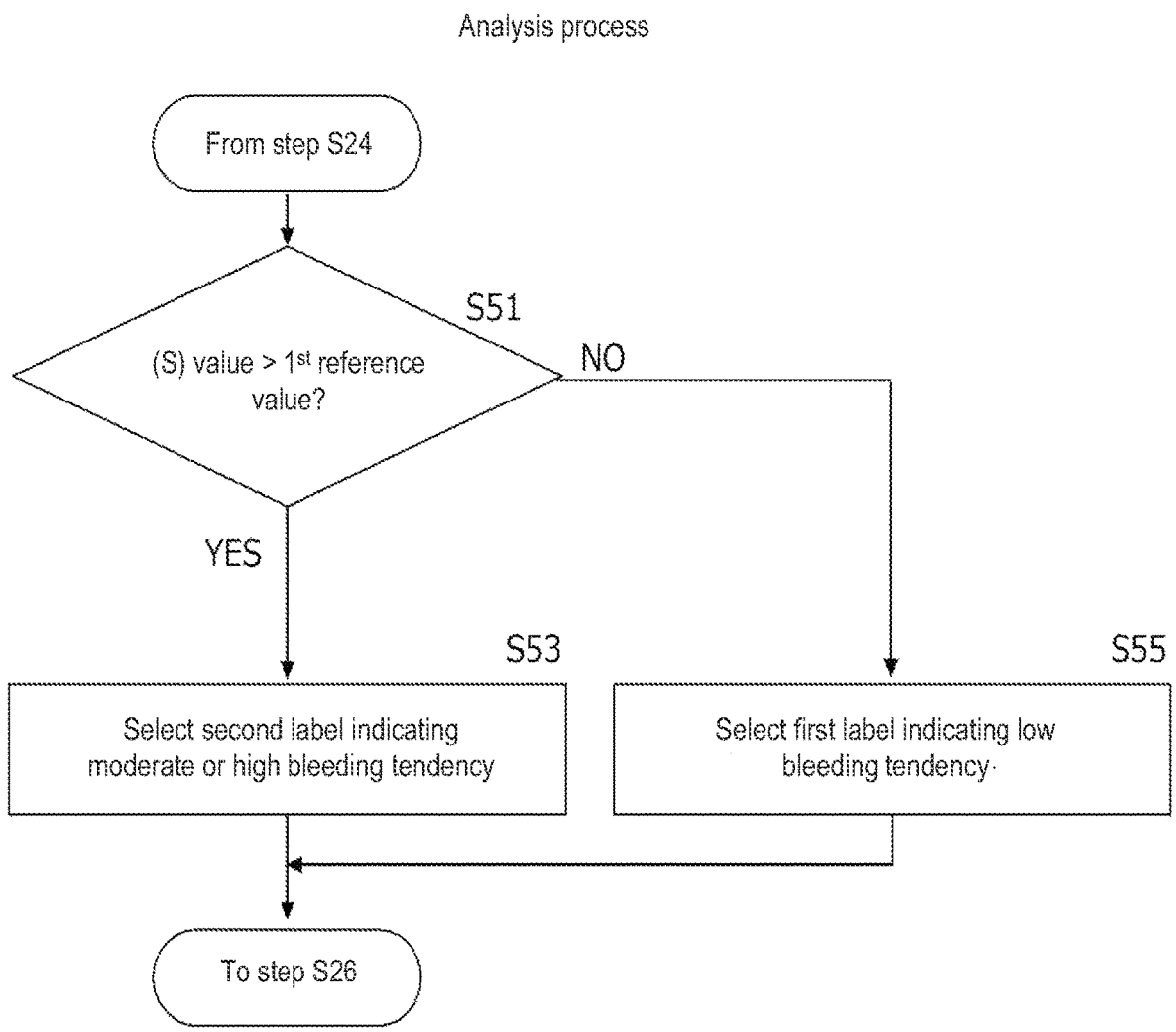
FIG. 11 is a diagram showing a flow of comparison processing.
Figure 12:
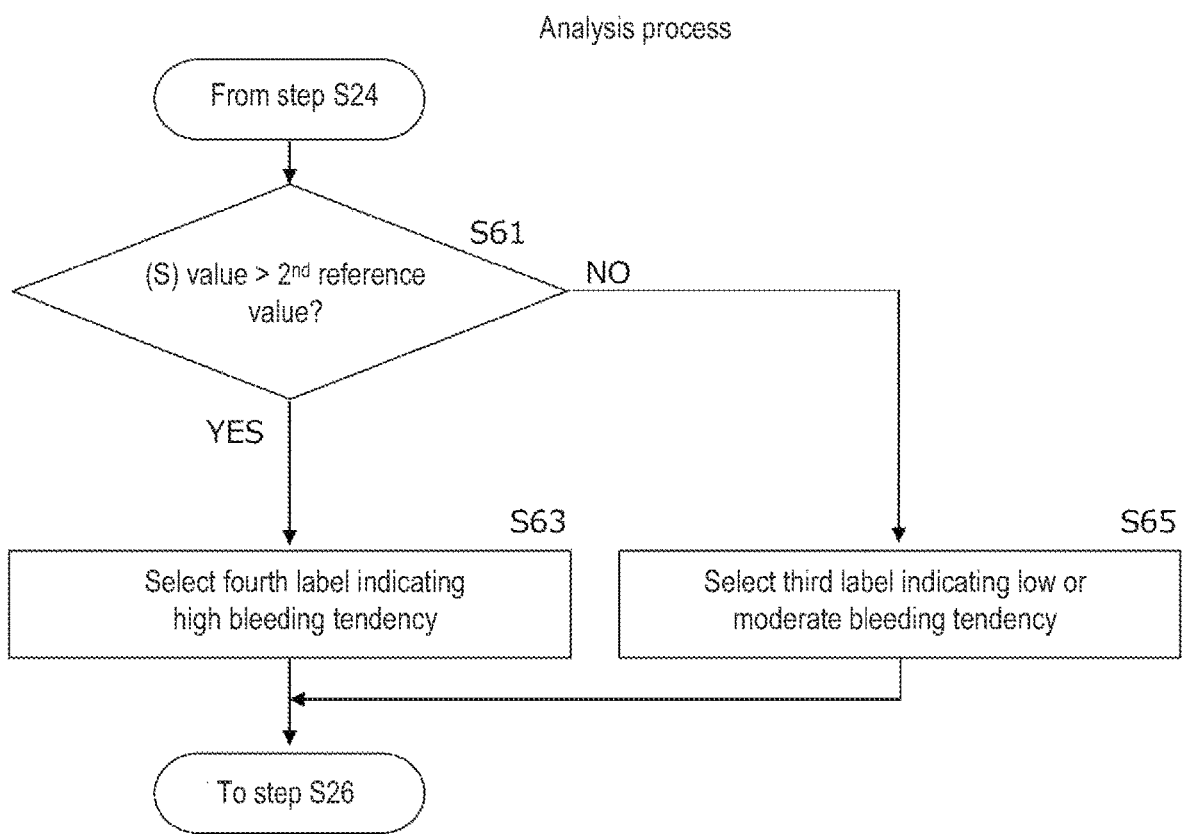
FIG. 12 is a diagram showing a flow of a modified example of the comparison process.

FIG. 12 shows a modified example of the comparison process shown in FIG. 11.

In this case, the label indicating the degree of bleeding tendency includes a third label indicating that the bleeding tendency is low or moderate, and a fourth label indicating that the bleeding tendency is high. The reference value is a second reference value for determining whether the subject has a low or moderate bleeding tendency or the subject has a high bleeding tendency. The second reference value is set such that, for a subject having an ISTH-BAT bleeding score value of 15 or less, a third label is output, and for a subject having an ISTH-BAT bleeding score value greater than 15, a fourth label is output.

In step S61, the value (S) and the second reference value are compared, and if the value (S) is larger ("YES"), the control device 10 proceeds to step S63 and selects a fourth label stored in the reference value database DB2, which indicates that the bleeding tendency is high. The control device 10 proceeds to step S26 shown in FIG. 8 and outputs the fourth label selected in step S63 to the output device 17 as information indicating that the subject has a high bleeding tendency.

In step S61, when the value (S) is equal to or less than the second reference value (when the determination is "NO"), the control device 10 proceeds to step S65 and selects a third label stored in the reference value database DB2, which indicates that the bleeding tendency is low or moderate. The control device 10 proceeds to step S26 shown in FIG. 8 and outputs the third label selected in step S65 to the output device 17 as information indicating that the subject has a low or moderate bleeding tendency.

Note that although one of the first reference value and the second reference value is used in the above example, both reference values may be used to determine a subject with a low bleeding tendency, a subject with a moderate bleeding tendency, and a subject with a high bleeding tendency.

Although the light receiving unit 22g of the detection unit 22 detects the light (transmitted light) transmitted through the cuvette 80 and the sample contained in the cuvette 80 in the above example, the detection unit 22 may receive the light (scattered light) scattered by the sample housed in the cuvette 80, and the control device 10 may analyze the blood coagulation reaction curve based on the change in the scattered light intensity.

2. Verification of Effect

Figure 13:
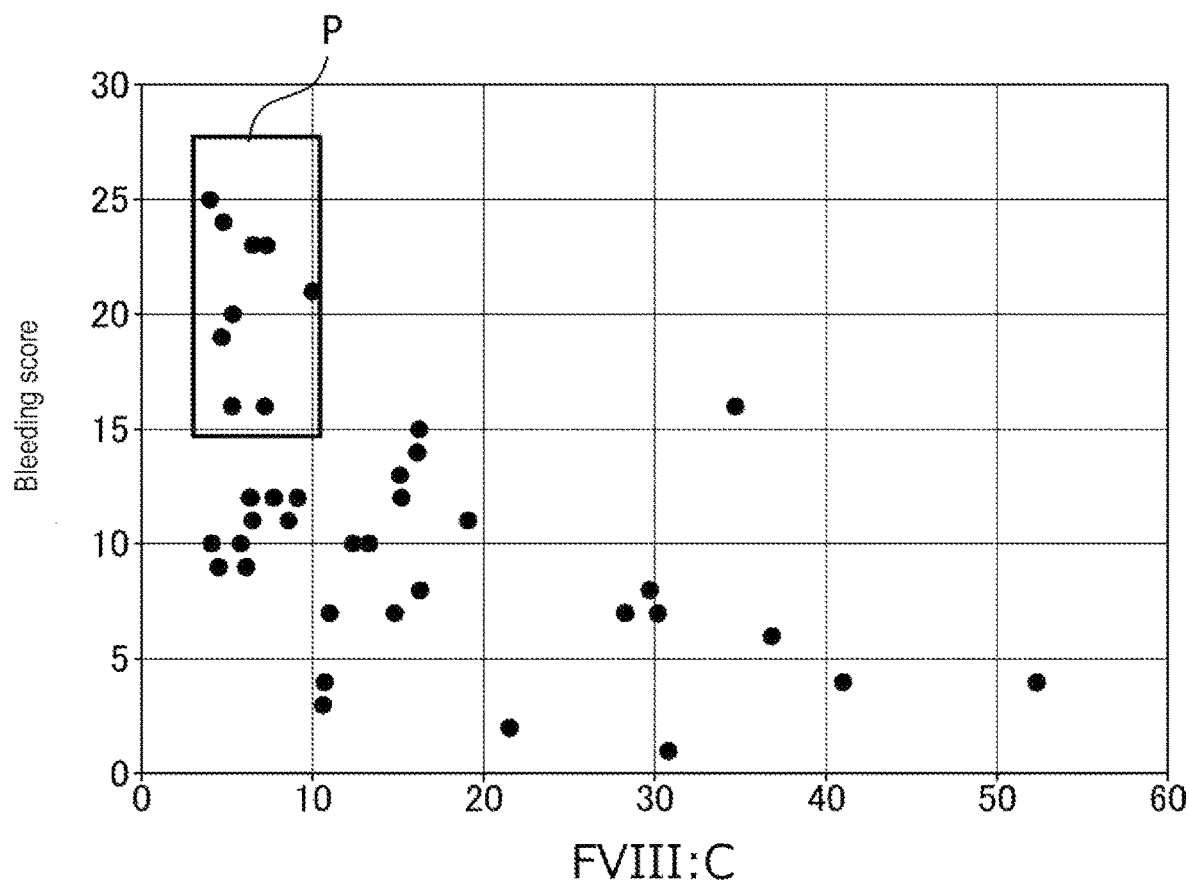
FIG. 13 is a plot of 41 hemophilia A patients plotted on a two-dimensional scatter plot with a vertical axis (Y-axis) showing bleeding score values and a horizontal axis (X-axis) showing FVIII activity.

In FIG. 13, the bleeding score value of ISTH-BAT was calculated for 41 subjects who were determined to be mild or moderate as a result of diagnosing the severity of hemophilia based on the activity measurement of FVIII; the figure shows a two-dimensional scatter plot in which the bleeding score value for each subject is shown on the vertical axis (Y-axis), and the horizontal axis (X-axis) shows the activity of FVIII. Frame P shown in FIG. 13 is a region to which a group of subjects having an ISTH-BAT bleeding score value greater than 15 and an FVIII activity of less than 10% belong. In the severity diagnosis of hemophilia based on the measurement of FVIII activity, if the activity of FVIII is 1% or more and less than 5%, it is determined to be moderate, and if the activity of FVIII is 5% or more and less than 40%, it is determined to be mild. Therefore, subjects belonging to frame P have a bleeding score value of ISTH-BAT greater than 15 and may experience severe bleeding, but the diagnosis based on the activity measurement of FVIII is mild or moderate.

Figure 14A:
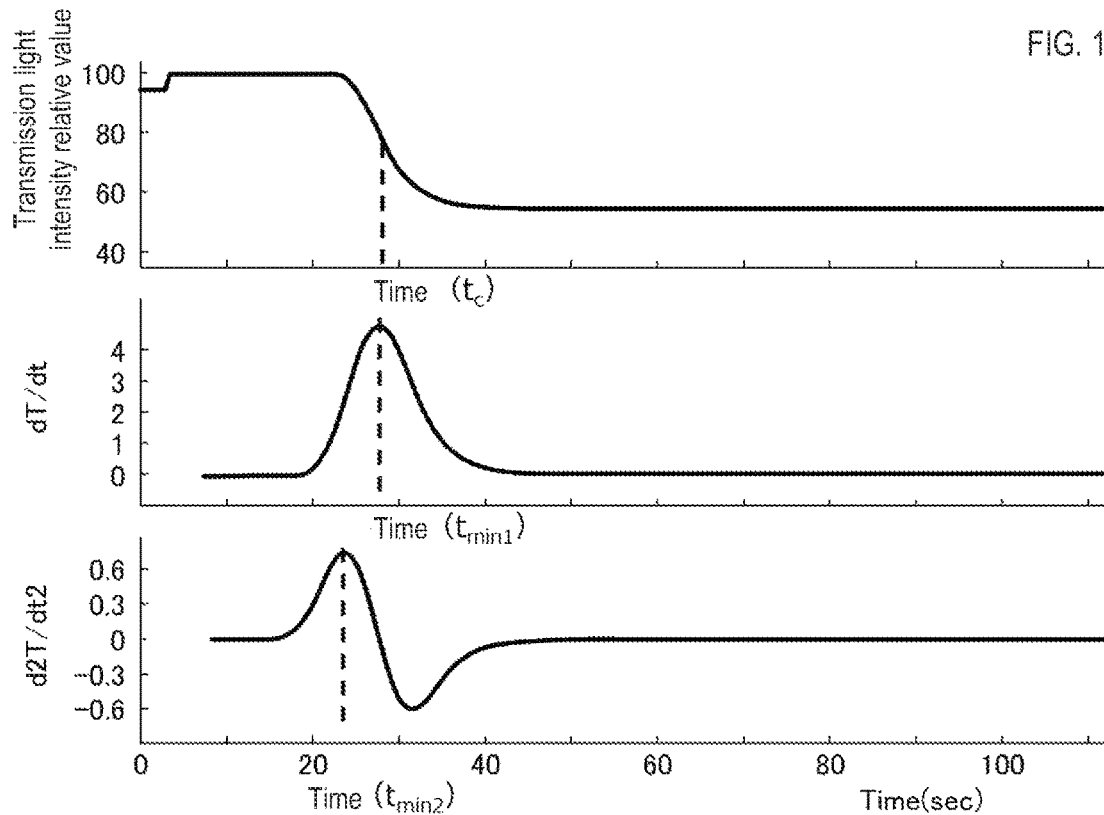
FIG. 14A shows a coagulation curve, a first derivative coagulation curve, and a second derivative coagulation curve of a healthy subject.
Figure 14B:
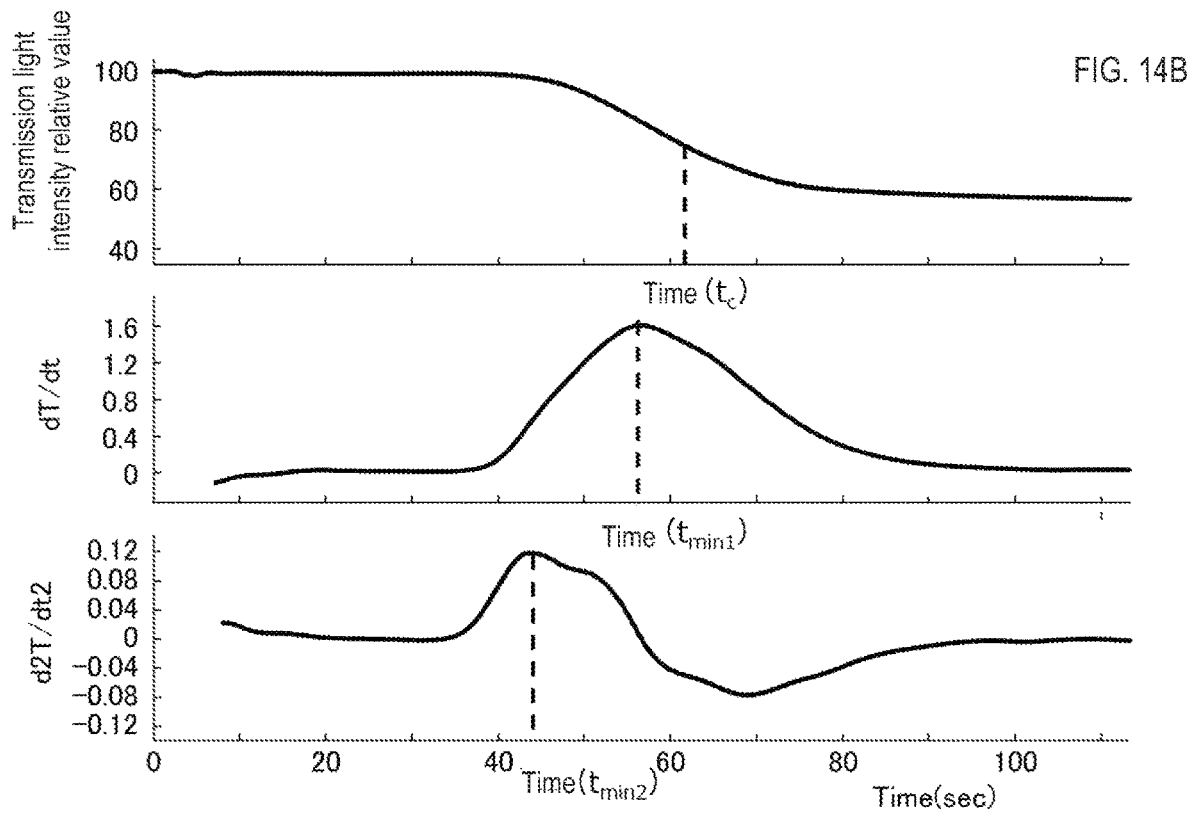
FIG. 14B shows a coagulation curve, a first derivative coagulation curve, and a second derivative coagulation curve of a subject having hemophilia A.

FIG. 14A shows a blood coagulation curve, a first derivative coagulation curve, and a second derivative coagulation curve of a healthy subject who does not have hemophilia in order from the top. FIG. 14B shows a blood coagulation curve, a first derivative coagulation curve, and second derivative coagulation curve of a subject having a ISTH-BAT bleeding score value of 25 with a high bleeding tendency (a subject belonging to the frame P shown in FIG. 13) shown in order from the top.

As shown in FIG. 14A, in the case of a healthy subject, the reference time ($t_c$) and the maximum speed arrival time (tmin1) are almost the same time. Therefore, since the value (S) is close to 0, in the comparative processing shown in FIGS. 11 and 12, the first label indicating that the bleeding tendency is low, or the third label indicating the bleeding tendency is low or moderate is selected. On the other hand, as shown in FIG. 14B, since the difference between the reference time ($t_c$) and the maximum speed arrival time (tmin1) is larger than the difference in the healthy subject when a subject has a high bleeding tendency, in the comparative process shown in FIGS. 11 and 12, a second label indicating that the bleeding tendency is moderate or high, or a fourth label indicating that the bleeding tendency is high is selected.

Similarly, the difference between the reference time ($t_c$) and the maximum acceleration arrival time ($t_{min2}$) is also larger for subjects with a high bleeding tendency than for healthy subjects, and therefore for subjects with a high bleeding tendency, a second label indicating a moderate or high bleeding tendency or a fourth label indicating a high bleeding tendency is selected.

Figure 15A:
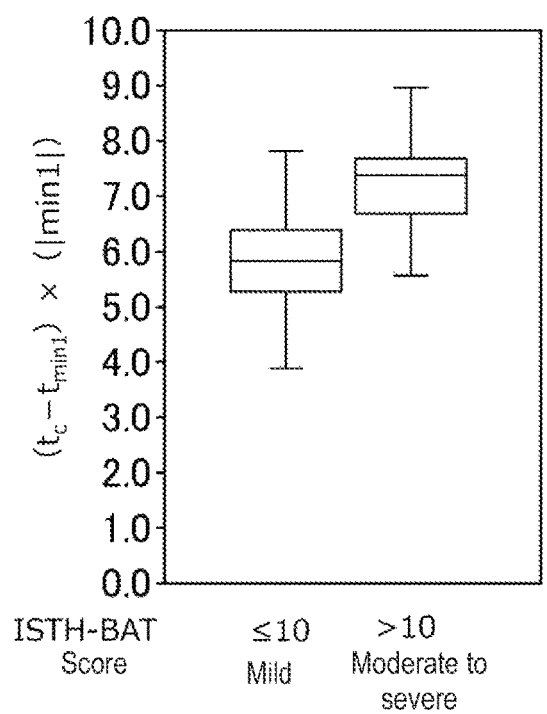
FIG. 15A is a box plot in which the value (S) obtained by the formula 1 is plotted on the vertical axis and the box plot on the left side shows a group of mild subjects, the box plot on the right side shows moderate or severe subjects.
Figure 15B:
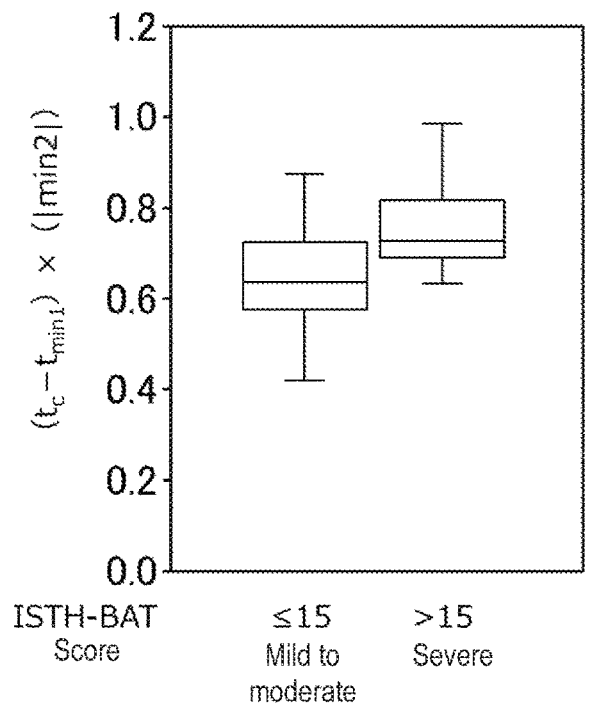
FIG. 15B is a box plot in which the value (S) obtained by the formula 2 is plotted on the vertical axis and the box plot on the left side shows a group of mild or moderate subjects, and the box plot on the right side shows a group of severe subjects.
Figure 15C:
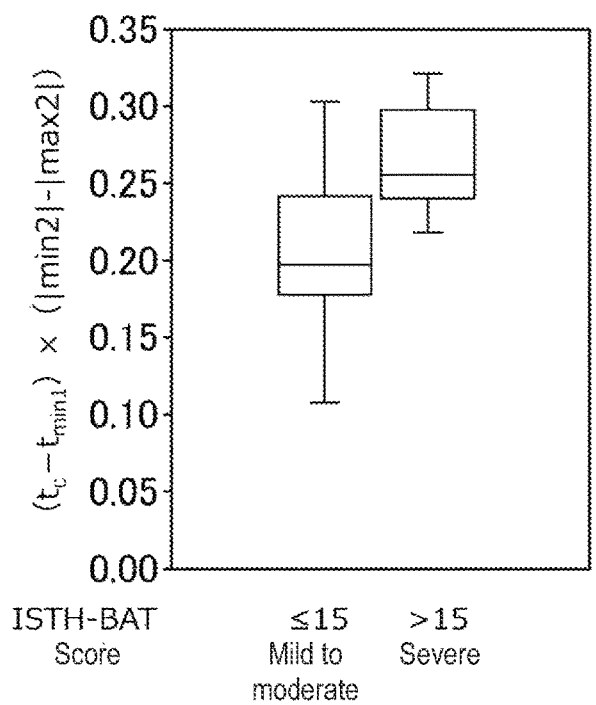
FIG. 15C is a box plot in which the value (S) obtained by the formula 3 is plotted on the vertical axis, and the box plot on the left side shows a group of mild or moderate subjects, and the box plot on the right side shows a group of severe subjects.

The effect of the present invention was verified by measuring APTT and obtaining the value (S) using the plasma of 41 subjects having hemophilia A, which was used to create the two-dimensional scatter plot of FIG. 13. The results are shown in FIGS. 15A to 15C. FIGS. 15A to 15C are box-and-whisker plots in which the vertical axis (Y-axis) shows the value (S). In creating the box-and-whisker plot of FIG. 15A, 41 subjects were divided into a group of subjects having a ISTH-BAT bleeding score value of 10 or less (a group of mild subjects), and a group of subjects with a ISTH-BAT bleeding score greater than 10 (a group of moderate or severe subjects). In FIG. 15A, the vertical axis shows the value (S) obtained using formula 1, the box-and-whisker plot on the left side shows the group of subjects with mild cases, and the box-and-whisker plot on the right side shows the moderate or severe cases.

As shown in FIG. 15A, by using the value (S), the ISTH-BAT bleeding score value was found to be highly correlated with the value (S) showing it is possible to distinguish between a group of mild subjects with an ISTH-BAT bleeding score of 10 or less and a group of moderate or severe subjects with an ISTH-BAT bleeding score greater than 10.

Similarly, in creating the box-and-whisker plots of FIGS. 15B and 15C, 41 subjects were divided into a group of subjects having a ISTH-BAT bleeding score value of 15 or less (a group of mild to moderate subjects), and a group of subjects with a ISTH-BAT bleeding score greater than 15 (a group of severe subjects). In FIG. 15B, the vertical axis shows the value (S) obtained using formula 2, the box-and-whisker plot on the left side shows the group of subjects with mild or moderate cases, and the box-and-whisker plot on the right side shows the severe cases. As shown in FIG. 15B, by using the value (S), the ISTH-BAT bleeding score value was found to be highly correlated with the value (S) showing it is possible to distinguish between a group of mild or moderate subjects with an ISTH-BAT bleeding score of 15 or less and a group of severe subjects with an ISTH-BAT bleeding score greater than 15.

In FIG. 15C, the vertical axis shows the value (S) obtained using formula 3, the box-and-whisker plot on the left side shows the group of subjects with mild or moderate cases, and the box-and-whisker plot on the right side shows the severe cases. As shown in FIG. 15C, by using the value (S), the ISTH-BAT bleeding score value was found to be highly correlated with the value (S) showing it is possible to distinguish between a group of mild or moderate subjects with an ISTH-BAT bleeding score of 15 or less and a group of severe subjects with an ISTH-BAT bleeding score greater than 15.

As described above, the value (S) has a high correlation with the ISTH-BAT bleeding score value, and by using the value (S), it is possible to determine subjects who belong to the frame P (FIG. 13) with a high bleeding score even though they are determined to be mild or moderate cases in the test based on the FVIII measurement, that is, it is possible to detect subjects who may experience severe bleeding, which could not be detected by measuring the activity level of FVIII.

Figure 16A:
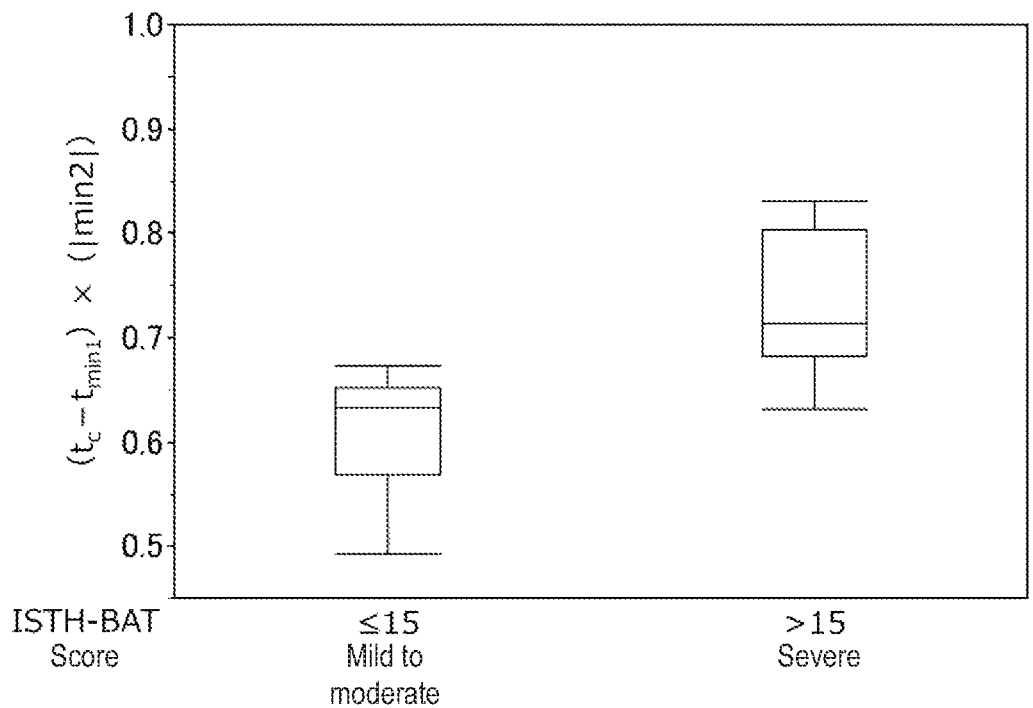
FIG. 16A is a box plot in which the value (S) obtained by Equation 2 is plotted on the vertical axis, the box plot on the left side shows a group of mild or moderate subjects, and the box plot on the right side shows a group of severe subjects.
Figure 16B:
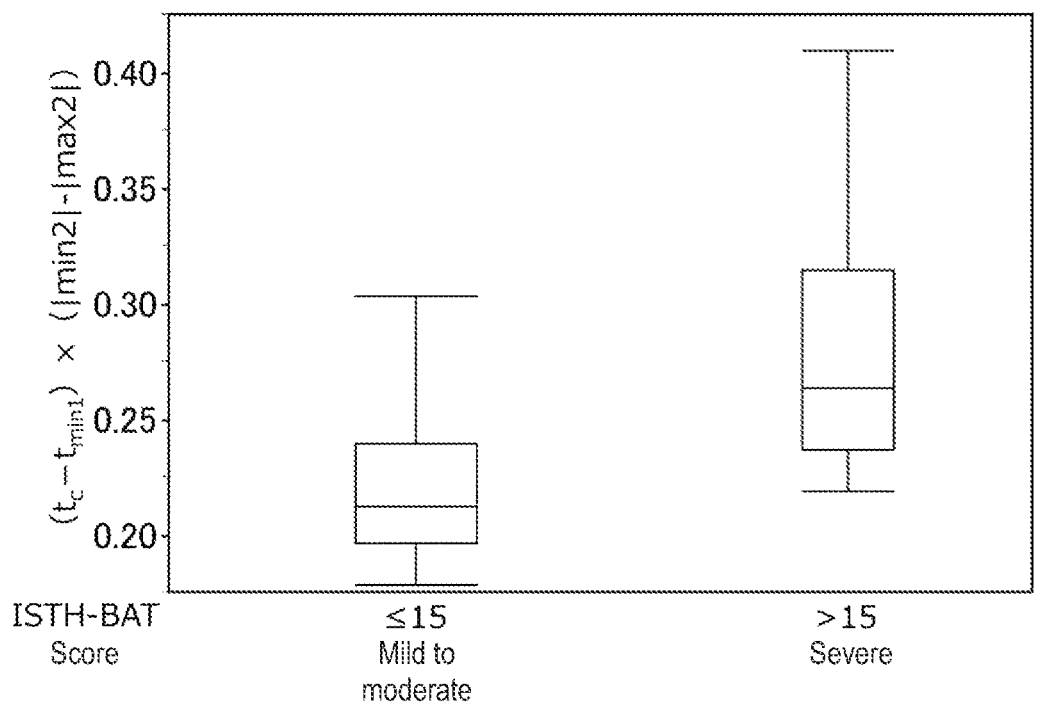
FIG. 16B is a box plot in which the value (S) obtained by the formula 3 is plotted on the vertical axis, and the box plot on the left side shows a group of mild or moderate subjects, and the box plot on the right side shows a group of severe subjects.

Next, in creating the box-and-whisker plots of FIGS. 16A and 16B, from the 41 subjects having hemophilia A used for creating the two-dimensional scatter plot of FIG. 13, subjects with an FVIII activity level of 10% or less were extracted, and the extracted subjects were differentiated as a group of subjects having an ISTH-BAT bleeding score value of 15 or less (a group of subjects with mild or moderate cases), and a group of subjects whose ISTH-BAT bleeding score was greater than 15 (a group of severe cases). In FIG. 16A, the vertical axis shows the value (S) obtained using formula 2, the box-and-whisker plot on the left side shows the group of subjects with mild or moderate cases, and the box-and-whisker plot on the right side shows the severe cases. As shown in FIG. 16A, by extracting subjects whose FVIII activity level is 10% or less, the ability to discriminate between the mild or moderate subject group and the severe subject group was improved in comparison with all subjects are targeted (see FIG. 15B). In FIG. 16B, the vertical axis shows the value (S) obtained using formula 3, the box-and-whisker plot on the left side shows the group of subjects with mild or moderate cases, and the box-and-whisker plot on the right side shows the severe cases. As shown in FIG. 16B, by extracting subjects whose FVIII activity level is 10% or less, the ability to discriminate between the mild or moderate subject group and the severe subject group was improved in comparison with all subjects are targeted (see FIG. 15B). Therefore, by extracting subjects whose FVIII activity level is less than a predetermined value, it is possible to more efficiently detect patients who may experience severe bleeding, who can not be detected by FVIII activity level measurement.

What is claimed is:

1. A blood coagulation analyzer configured to analyze a bleeding tendency of a subject, comprising:
   a measuring device comprising:
      a sample preparator configured to prepare a blood sample containing plasma, coagulation time measuring reagent, and coagulation activation reagent,
      a holder configured to hold a container through which light passes, the container held in the holder containing the blood sample that has started a coagulation reaction,
      a light source configured to irradiate to the blood sample in the container held in the holder, and
      a detector configured to detect light from the blood sample irradiated by the light source and output signals corresponding to the detected light; and
   a controller programed to:
      obtain a time-series data set of the coagulation reaction of the blood sample based on the signals outputted from the detector;
      obtain, based on the time-series data set, a maximum speed arrival time from a start of the coagulation reaction until a coagulation reaction speed is maximized or a maximum acceleration arrival time from the start of the coagulation reaction until a coagulation reaction acceleration is maximized, and a reference time in the coagulation reaction, the reference time being a time from the start of the coagulation reaction until the blood sample reaches a predetermined coagulation state;
      obtain a value(S) based on the maximum speed arrival time or the maximum acceleration arrival time, and the reference time, wherein the value(S) is a first difference between the maximum speed arrival time and the reference time, a second difference between the maximum acceleration arrival time and the reference time, a first product of the first difference and a coefficient, or a second product of the second difference and the coefficient, the coefficient being based on a first absolute value of a coagulation reaction speed at the maximum speed arrival time from the start of the coagulation reaction, or a second absolute value of the coagulation reaction acceleration at the maximum acceleration arrival time from the start of the coagulation reaction; and
      output information relating to the bleeding tendency based on the value(S), the information including a label indicating a degree of the bleeding tendency according to the value(S).

2. The blood coagulation analyzer of claim 1, wherein the measuring device further comprises
an optical fiber connecting the light source and the holder.

3. The blood coagulation analyzer of claim 2, wherein the holder comprises a first hole and a second hole at a position facing the first hole, and
one end of the optical fiber is inserted in the first hole and the detector is disposed behind the second hole.

4. The blood coagulation analyzer of claim 1, wherein the controller is programmed to obtain the value(S) based on the maximum speed arrival time or the maximum acceleration arrival time, the reference time, and the coefficient.

5. The blood coagulation analyzer of claim 1, wherein the controller is programmed to select, as the label indicating the degree of the bleeding tendency, a first label indicating that the bleeding tendency is low or moderate, or a second label indicating that the bleeding tendency is high based on the value(S).

6. The blood coagulation analyzer of claim 1, wherein the controller is programmed to select, as the label indicating a degree of the bleeding tendency, a first label indicating that the bleeding tendency is low, or a second label indicating that the bleeding tendency is moderate or high based on the value(S).

7. The blood coagulation analyzer of claim 1, wherein the controller is programmed to
obtain, based on the time-series data set, the maximum speed arrival time, and
obtain the value(S) based on the maximum speed arrival time and the reference time.

8. The blood coagulation analyzer of claim 1, wherein the controller is programmed to obtain the value(S) by any one of the following formulas:

$$\text{Value}(S) = (t_c - t_{min1}) \times (|\text{min 2}|) \quad \text{(Formula 1)}$$

$$\text{Value}(S) = (t_c - t_{min1}) \times (|\text{min 2}|) \quad \text{(Formula 2)}$$

$$\text{Value}(S) = ((t_c) - t_{min1}) \times (|\text{min 2}| - |\text{max 2}|) \quad \text{(Formula 3)}$$

(wherein ($t_c$) indicates the reference time, $t_{min1}$ indicates the maximum speed arrival time, |min1| indicates an absolute value of a coagulation reaction speed at the maximum speed arrival time, |min2| indicates an absolute value of the coagulation reaction acceleration at the maximum acceleration arrival time, and |max2| indicates an absolute value of a maximum coagulation reaction deceleration that is a minimum value of the coagulation reaction acceleration (in the formula, — indicates subtraction and x indicates multiplication).

9. The blood coagulation analyzer of claim 1, wherein the controller is programmed to
obtain an activity level of coagulation factor VIII in the blood sample of the subject, and
in response to the activity level of the coagulation factor VIII is less than a predetermined threshold value, execute the obtaining of the time-series data set, the obtaining of the maximum speed arrival time or the maximum acceleration arrival time and the reference time, the obtaining of the value(S), and the outputting of the information relating to the bleeding tendency.

10. The blood coagulation analyzer of claim 1, wherein the coagulation time measuring reagent is a test reagent for activated partial thromboplastin time (APTT) measurement.

11. The blood coagulation analyzer of claim 1, wherein the subject has hemophilia A.

* * * * *